United States Patent Office 3,550,359
Patented Dec. 29, 1970

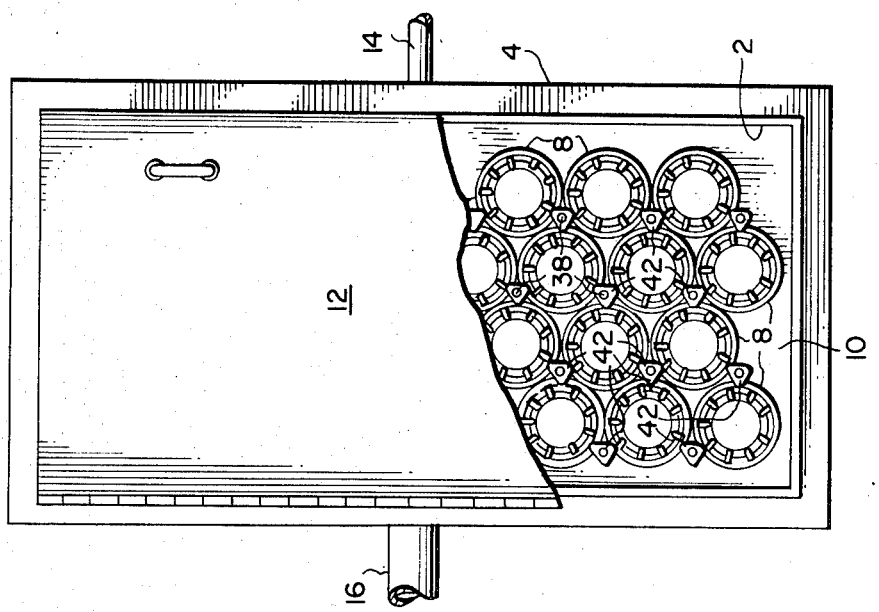
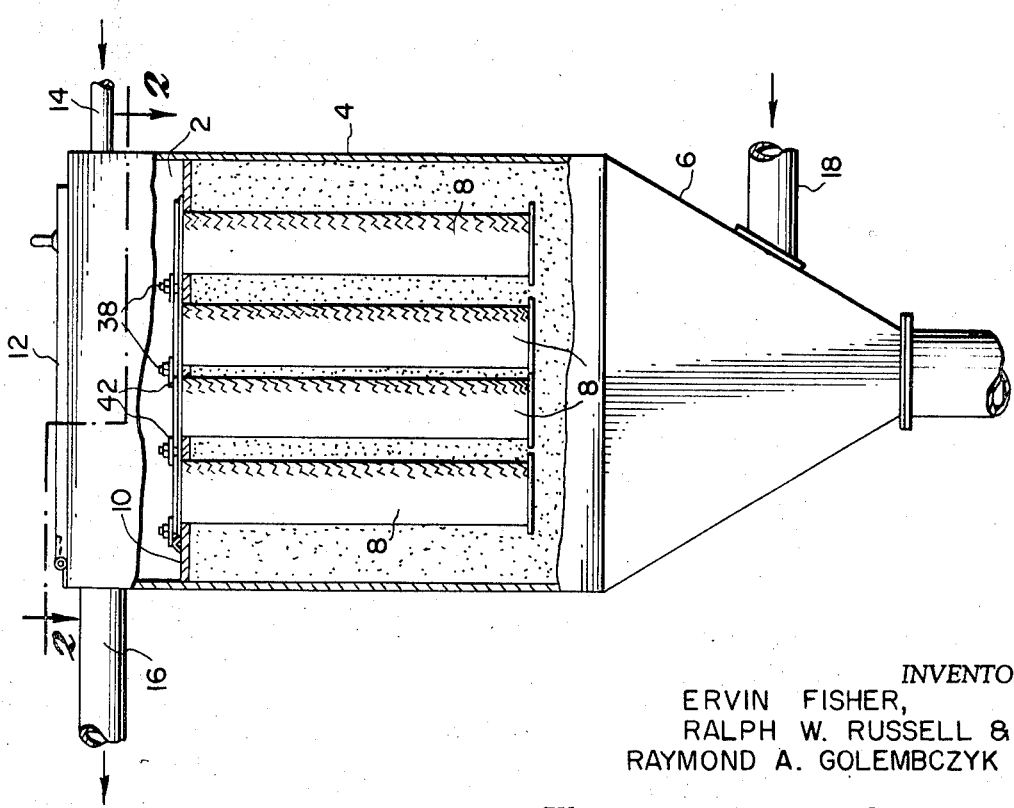

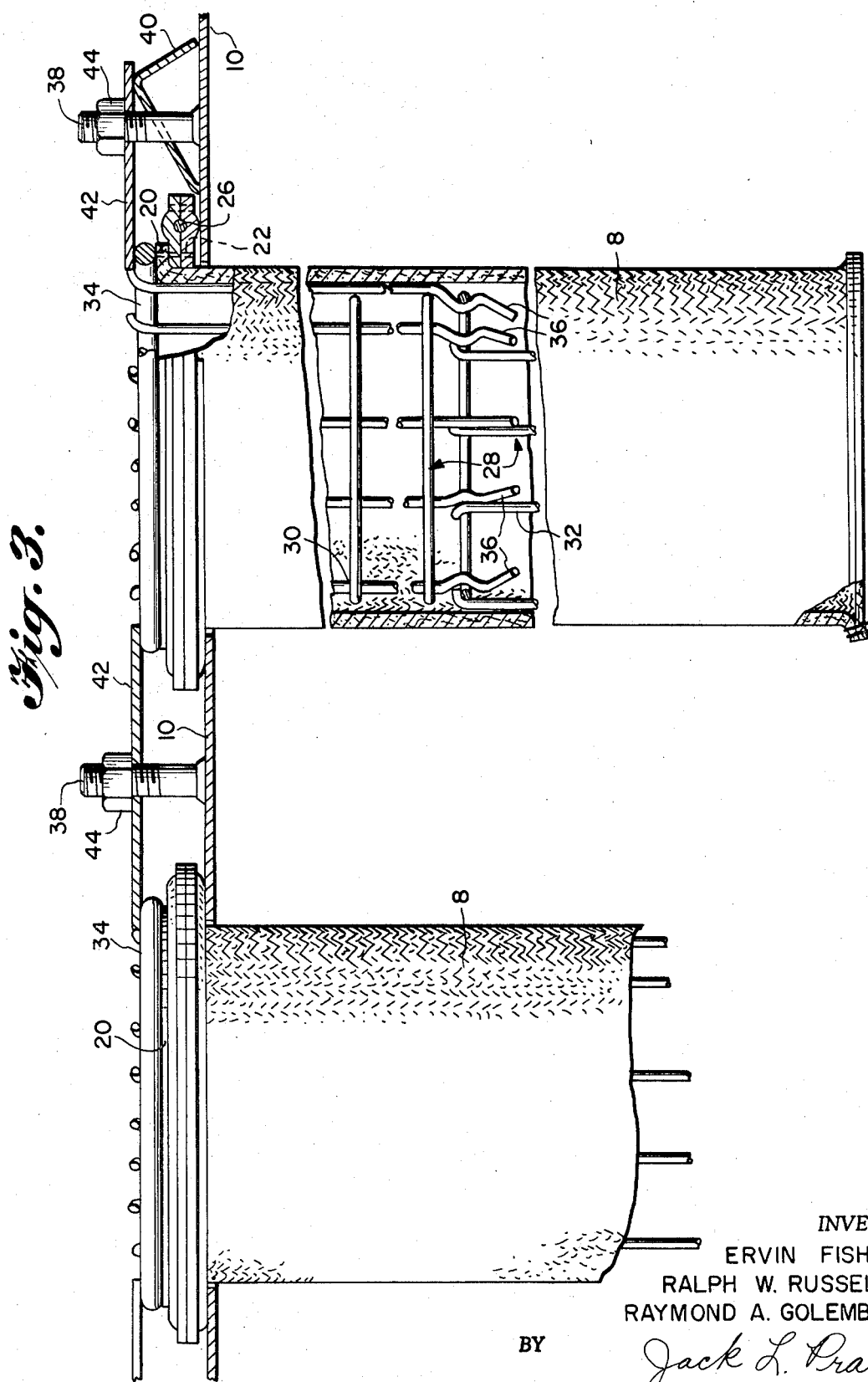

3,550,359
FILTER BAG CLAMPING APPARATUS
Ervin Fisher, Allentown, Pa., and Ralph W. Russell, North Royalton, and Raymond A. Golembczyk, Garfield Heights, Ohio, assignors to Fuller Company, Catasauqua, Pa.
Filed Nov. 29, 1968, Ser. No. 779,688
Int. Cl. B01d 46/02
U.S. Cl. 55—341                                    7 Claims

ABSTRACT OF THE DISCLOSURE

A filter bag clamping arrangement for use in a dust collector wherein the bags are mounted on a support plate and open at the bag end secured to the support plate to allow gas flow from baghouse to plenum chamber and vice versa; each bag having an outer annular flange at its open end with a solid ring member sewn therein and of greater diameter than the bag receiving aperture of the support plate; an internal cage member adapted to be fitted within each bag and having a ring member of greater diameter than the bag receiving aperture of the support plate, but of lesser diameter than ring member of the bag; and a clamp secured to the support plate for pressing the cage ring member, bag flange and support plate into sealingly secured relation to one another.

BACKGROUND OF THE INVENTION

Our invention relates to a filter bag clamping arrangement for securing filter bags to the bag support plate member in dust collectors, particularly dust collectors used in industry for cleaning industrial waste gases.

Conventionally, the type of dust collector referred to is one comprising a hopper for collecting filter dust and other particulate matter separated from the dirty gas, an intermediate baghouse having a plurality of filter bags therein, and a plenum chamber through which is emitted the dirty gases for cleaning, the cleaned gas, cleaning gas or a combination of these. In all such types we refer to, there is a filter bag support member between either the hopper and baghouse or plenum chamber and baghouse. Prior to our invention, it was the practice to clamp the filter bags to the support plate by clamping means situated solely within the baghouse. Such a clamping arrangement is shown in assignee's earlier patents to Smith 3,325,979 and Lincoln 3,158,455.

SUMMARY

Our invention provides a clamping arangement wherein the necessity of having to enter the dirty baghouse to install, repair and inspect the filter bags is eliminated. Our invention provides a much more simplified and efficient means of clamping the bags to the bag support member than heretofore known, and provides an easily accessible clamping arrangement wherein the need for entering the baghouse is totally eliminated.

In our invention, the filter bag includes an annular cloth flange at its open end. A rigid ring-shaped member is sewn into such flange and is of greater diameter than the bag receiving aperture of the bag support member. A cage member is fitted within the bag and includes an annular ring of greater diameter than the bag receiving aperture of the bag support member but lesser diameter than the annular ring member in the bag flange. The bag flange is pressed between the cage ring and bag support member by a screw down type clamp member secured to the bag support member which presses downwardly on the cage ring. Generally, three equally spaced clamp members may be used per bag. Where the dust collector includes a plurality of bags, any one or more adjacent pairs of filter bags may be secured to the bag support member by a common clamp member.

Other objects and advantages additional to those stated above will be apparent upon reading the following detailed description of our preferred embodiment in connection with the drawings in which:

FIG. 1 is a generally schematic front view partially in section of a dust collector of the type generally referred to herein for practicing our invention;

FIG. 2 is a plan view partially in section of the bag clamping arrangement of our invention as taken along lines II—II of FIG. 1; and FIG. 3 is a front view of the bag clamping arrangement of our invention.

In FIG. 1, there is shown a dust collector comprising a plenum chamber 2, an intermediate baghouse 4, and a hopper 6. A plurality of filter bags 8 are suspended from support plate member 10 between baghouse 4 and plenum chamber 2. Plenum chamber 2 includes a hinged door 12 mounted on the top thereof to provide easy access to the bag clamping arrangement of our invention. Plenum chamber 2 also includes an inlet 14 for cleaning gas and an outlet 16 for cleaned gas, whereas the hopper includes an inlet 18 for dirty gas to be cleaned, all of which forms no part of our invention since our invention is not in any way limited to use solely with this type dust collector.

FIGS. 2 and 3 shows the means by which each of the bags are clamped to and supported from support member 10. The bags 8 are of cylindrical shape and are usually made of any suitable fabric such as synthetic or natural woven cloth or felt, or the like depending on the environmental conditions to which they will be exposed. The top portion 20 is folded over and stitched as shown at 22 to a second fabric member 24 of circular shape forming an annular flange and having a steel ring or the like 26 sewn therein to provide structural strength. The steel ring 26 is of greater diameter than the opening in support plate 10 through which the bag extends. Thus when installing the bag from the top of support plate 10, the bag may be dropped through the opening into the area of the baghousing without fear of its falling through. Each bag is reinforced at its inner surface to prevent it from collapsing to an undesirable degree by a two-piece cage member 28 having a top section 30 and a bottom section 32. The cage may also be of unitary construction as is well known in the art. However, the sectional cage as constructed in the manner described herein avoids the necessity of increased head room above the top of the dust collector. The cage may be of any number of sections, but it has been found that with the present standard bag lengths of 6 to 10 feet a two-piece cage provides the easiest handling. Each section of the cage is of conventional wire screen construction, but at the top portion of cage section 30 there is provided a steel ring member 34 of greater diameter than the opening of support plate 10 which rest atop bag portion 20. The bottom portion of cage section 30 is of S shape so as to provide a clamp portion 36 for receiving and holding the uppermost portion of the bottom section of cage 32. When installing such a cage, the bottom section 32 may be lowered partly into place and joined to section 30 by inserting top section 30 into section 32 and pushing them together until the clamping portion 36 locks the bottom section into place. The bags are locked or clamped to support plate 10, by means of flush welding "Nelson" studs 38 to plate 10. Next a spacing member 40 may be positioned on the respective stud, followed by a triangular shaped plate 42. As seen in FIG. 2 each bag, with the exception of outside bags, is clamped at three equidistant points at its periphery by the triangular plates 42 which engage cage ring member 34 and press same downwardly into sealing engagement with the bag and support plate by means of tightening nut 44. It is only necessary, if at all, to use spacing members 40 on the bags positioned along the outer peripheral portions of the support plate since the sole purpose of the spacing member 40 is to prevent plate 42 from cocking on bolt 38. Plate 42, because of its triangular shape lends itself to quick disassembly of the bags when disassembling for removal of the bags for inspection. It is merely necessary to back the nut 44 off several turns thereby freeing plate 42 so that it may be manually rotated by hand approximately 60° or so to a point where it is disengaged from steel ring member 34 of each cage. The plate and nut may be of any other suitable configuration such as being of one piece and having two or four lobes or more. The essential feature being that upon rotating the clamp member the outer extending portions or lobes will be disengaged from the cage structure thereby allowing the cage and bag to be withdrawn.

Having shown and described merely a preferred embodiment of our invention, we do not wish the scope of our invention to be restricted thereto in any manner except as defined within the metes and bounds of the appended claims.

We claim:

1. In combination with a filter support member for supporting filter elements within a baghouse of a dust collector and having at least one filter element receiving aperture, a filter element assembly and clamping arrangement comprising:
   an elongate porous filter element being open at one end, a flange extending outwardly from said open end, said flange including a substantially rigid reenforcing means of greater outer dimension than the aperture of said filter element support member;
   a cage means fitted within said element, said cage means having a cage ring member at the end thereof adjacent the open end of said filter element, said cage ring member being of greater outer dimension than the aperture of said filter element support member and being of lesser outer dimension than said reenforcing means;
   said cage means being supported within said filter element by means of the cage ring member lying atop said flange of said filter element; and
   clamping means for pressing down upon said cage member to sealingly secure said filter element to said filter element support member.

2. The combination as defined in claim 1 wherein:
said filter element comprises an annular bag; and
said filter element flange, reenforcing means, and cage ring member are of annular shape and concentric in shape to one another.

3. The combination as defined in claim 1 wherein:
said clamping means comprises at least one fastener, said fastener including a vertical threaded stud means secured to said support member, an apertured plate loosely fitted on said stud means for rotation relative thereto, and bolt means in threaded engagement with said stud means for pressing said apertured plate downwardly into firm engagement with said cage ring member.

4. The combination as defined in claim 2 wherein:
said clamping means comprises at least one fastener, said fastener including a vertical threaded stud means secured to said support member, an apertured plate loosely fitted on said stud means for rotation relative thereto, and bolt means in threaded engagement with said stud means for pressing said apertured plate downwardly into firm engagement with said cage ring member.

5. In combination with a filter element support member for supporting filter elements within a baghouse of a dust collector and having at least one filter element receiving aperture a filter element assembly and clamping arrangement comprising:
   an elongate porous filter element being in a general shape of an annular bag and being open at one end, an integral annular flange extending radially outwardly from said open end around the periphery thereof, said outer flange including an annular substantially rigid reenforcing means of greater diameter than the filter element receiving aperture of said filter element support member, said reenforcing means comprising a ring member within said flange;
   cage means fitted within said filter element, said cage means having an annular cage ring member at the end thereof adjacent the open end of said filter element, said cage ring member being of greater diameter than the filter element receiving aperture of said filter element support member and being of lesser diameter than said reenforcing means;
   said cage means being supported within said filter element by means of the cage ring member lying atop said annular flange of said filter element;
   clamping means for pressing downwardly upon said cage ring member to sealingly secure said filter element to said filter element support member, said clamping means comprising at least one fastener, said fastener including a vertical threaded stud means secured to said filter element support member, an apertured plate loosely fitted on said stud means for rotation relative thereto, said aperture plate having at least one outwardly extending lobe, and bolt means in threaded engagament with said stud means for pressing said lobe of said aperture plate downwardly into firm engagement with said cage ring member.

6. In combination with a filter element support member for supporting filter elements within a baghouse of a dust collector and having a plurality of equally spaced filter element receiving apertures, a filter element assembly and clamping arrangement comprising:
   a plurality of elongate flexible porous filter elements, each of said filter elements being in the general shape of an annular bag and open at one end, an integral annular flange extending radially outwardly from said open end around the periphery thereof, said outer flange including an annular substantially rigid reenforcing means of greater diameter than the filter element receiving apertures of said filter element support member, said reenforcing means comprising a ring member within said flange;
   a cage means fitted within each said filter element, said cage means having an annular ring member at the end thereof adjacent the open end of said filter element, said cage ring member being of greater diameter than the filter element receiving apertures of said filter element support member and being of lesser diameter than said reenforcing means, said cage means being supported within said filter element by means of the ring cage member lying atop said annular flange of said filter element;
   clamping means for sealingly securing said filter elements to said filter element support member, said clamping means comprising a plurality of fasteners, each said fastener including a vertical threaded stud means secured to said support member, an apertured plate loosely fitted on said stud means for rotation relative thereto, said apertured plate having a plurality of outwardly extending lobes, and bolt means in threaded engagement with said stud means, at least one said fastener being substantially equally spaced between two adjacent filter elements whereby said bolt means may be threaded downwardly upon said stud means to press a respective lobe of said plurality of lobes of said aperture plate into firm engagement with said cage ring member of each of said adjacent filter elements.

7. The combination as defined in claim 6 wherein:
at least one of said cage means comprises a plurality of annular sections vertically disposed relative to one another and extending the full length of the respective said bag, each said section being of wire screen including a plurality of spaced horizontal and vertical rods, means for locking any two adjacent sections of said plurality of section to one another, said means comprising an S-shaped means formed at the respective end of a plurality of said vertically extending rods of one of said two adjacent sections, each said S-shaped portion being in interlocking engagement with the outermost horizontally disposed rod of the other of said two adjacent sections.

References Cited

UNITED STATES PATENTS

| 1,847,368 | 3/1932 | Wendler | 55—379X |
| 3,377,783 | 4/1968 | Young | 55—302 |
| 3,421,295 | 1/1969 | Swift et al. | 55—341X |

FOREIGN PATENTS

| 981,533 | 1/1951 | France | 55—341 |
| 887,772 | 1/1962 | Great Britain | 55—379 |

DENNIS E. TALBERT, Jr., Primary Examiner

U.S. Cl. X.R.

55—379, 381, 481